United States Patent
Young et al.

(10) Patent No.: US 9,759,561 B2
(45) Date of Patent: Sep. 12, 2017

(54) HEADING CONSTRAINTS IN A PARTICLE FILTER

(71) Applicant: TRX Systems, Inc., Greenbelt, MD (US)

(72) Inventors: Travis Young, Rockville, MD (US); John Miller, Ellicott City, MD (US); John Karvounis, Bowie, MD (US); Dan Hakim, Silver Spring, MD (US); Jared Napora, Severn, MD (US); Benjamin Funk, Hanover, MD (US); Carole Teolis, Glenn Dale, MD (US)

(73) Assignee: TRX Systems, Inc., Greenbelt, MD (US)

( * ) Notice: Subject to any disclaimer, the term of this patent is extended or adjusted under 35 U.S.C. 154(b) by 0 days.

(21) Appl. No.: 14/714,216

(22) Filed: May 15, 2015

(65) Prior Publication Data
US 2016/0195391 A1 Jul. 7, 2016

Related U.S. Application Data

(60) Provisional application No. 62/100,460, filed on Jan. 6, 2015.

(51) Int. Cl.
*G01C 17/38* (2006.01)
*G01S 19/42* (2010.01)
*G01S 5/02* (2010.01)

(52) U.S. Cl.
CPC .......... *G01C 17/38* (2013.01); *G01S 5/0247* (2013.01); *G01S 5/0252* (2013.01); *G01S 5/0278* (2013.01); *G01S 19/42* (2013.01)

(58) Field of Classification Search
CPC ...... G01C 21/206; G01C 25/00; G01C 17/38; G01C 21/00; G01C 21/12; G01C 21/3626; G01S 19/39; G01S 5/0263; G01S 5/0268; G01S 5/0294; H04W 4/043
USPC ........................................................ 701/525
See application file for complete search history.

(56) References Cited

U.S. PATENT DOCUMENTS

| | | | |
|---|---|---|---|
| 6,024,655 | A | 2/2000 | Coffee |
| 6,560,531 | B1 | 5/2003 | Joshi |
| 7,106,189 | B2 | 9/2006 | Burnenske et al. |
| 7,299,056 | B2 | 11/2007 | Anderson |
| 7,304,571 | B2 | 12/2007 | Halsey et al. |
| 7,890,262 | B2 | 2/2011 | Judd et al. |
| 8,032,153 | B2 | 10/2011 | Dupray et al. |
| 8,145,419 | B2 | 3/2012 | Onome et al. |
| 8,150,650 | B2 | 4/2012 | Goncalves et al. |
| 8,331,335 | B2 | 12/2012 | Chhabra |
| 8,462,745 | B2 | 6/2013 | Alizadeh-Shabdiz |

(Continued)

FOREIGN PATENT DOCUMENTS

| | | |
|---|---|---|
| WO | WO 2012/050932 A1 | 4/2012 |
| WO | WO 2012/072957 A1 | 6/2012 |

OTHER PUBLICATIONS

U.S. Appl. No. 13/566,956, filed Aug. 3, 2012, Karvounis.

(Continued)

*Primary Examiner* — Harry Oh
(74) *Attorney, Agent, or Firm* — Baker & Hostetler LLP

(57) ABSTRACT

A method for computing a correction to a compass heading for a portable device worn or carried by a user is described. The method involves determining a heading for the device based on a compass reading, collecting data from one or more sensors, determining if the device is indoors or outdoors based on the collected data, and correcting the heading based on the determination of whether the device is indoors or outdoors.

17 Claims, 18 Drawing Sheets

(56) References Cited

U.S. PATENT DOCUMENTS

| | | | |
|---|---|---|---|
| 8,473,241 B2 | 6/2013 | Foxlin | |
| 8,521,418 B2 | 8/2013 | Ma et al. | |
| 8,538,687 B2 | 9/2013 | Plocher et al. | |
| 8,688,375 B2 | 4/2014 | Funk et al. | |
| 8,706,414 B2 | 4/2014 | Funk et al. | |
| 8,712,686 B2 | 4/2014 | Bandyopadhyay et al. | |
| 8,751,151 B2 | 6/2014 | Funk et al. | |
| 9,148,764 B2* | 9/2015 | Das | H04W 4/028 |
| 2004/0021569 A1 | 2/2004 | Lepkofker et al. | |
| 2005/0242947 A1 | 11/2005 | Burneske et al. | |
| 2007/0121560 A1 | 5/2007 | Edge | |
| 2008/0033645 A1 | 2/2008 | Levinson et al. | |
| 2008/0077326 A1 | 3/2008 | Funk et al. | |
| 2009/0019402 A1 | 1/2009 | Ke et al. | |
| 2009/0043504 A1* | 2/2009 | Bandyopadhyay | G01C 17/38 701/469 |
| 2009/0060085 A1 | 3/2009 | Nadler et al. | |
| 2009/0179869 A1* | 7/2009 | Slotznick | G06F 3/0202 345/173 |
| 2009/0248304 A1 | 10/2009 | Roumeliotis et al. | |
| 2009/0262974 A1 | 10/2009 | Lithopoulos | |
| 2009/0321094 A1 | 12/2009 | Thomas | |
| 2010/0187406 A1* | 7/2010 | Van Dalen | G01J 1/4204 250/214 AL |
| 2010/0305845 A1 | 12/2010 | Alexandre et al. | |
| 2011/0080848 A1 | 4/2011 | Khorashadi et al. | |
| 2011/0098921 A1 | 4/2011 | Miller et al. | |
| 2011/0172906 A1 | 7/2011 | Das et al. | |
| 2011/0182238 A1 | 7/2011 | Marshall et al. | |
| 2011/0204895 A1 | 8/2011 | Zeller et al. | |
| 2011/0212717 A1 | 9/2011 | Rhoads et al. | |
| 2011/0238308 A1 | 9/2011 | Miller et al. | |
| 2011/0282622 A1 | 11/2011 | Canter | |
| 2012/0021764 A1 | 1/2012 | Enright | |
| 2012/0072052 A1 | 3/2012 | Powers et al. | |
| 2012/0093408 A1 | 4/2012 | Tang et al. | |
| 2012/0143495 A1 | 6/2012 | Dantu | |
| 2012/0203453 A1* | 8/2012 | Lundquist | G01C 21/005 701/434 |
| 2012/0235865 A1 | 9/2012 | Nath et al. | |
| 2013/0046505 A1* | 2/2013 | Brunner | G01C 21/165 702/141 |
| 2013/0096817 A1 | 4/2013 | Fauci et al. | |
| 2013/0131985 A1 | 5/2013 | Weiland et al. | |
| 2013/0179067 A1 | 7/2013 | Trowbridge et al. | |
| 2013/0267260 A1* | 10/2013 | Chao | G09B 29/005 455/457 |
| 2013/0293416 A1 | 11/2013 | Waters et al. | |
| 2013/0311134 A1 | 11/2013 | Kordari et al. | |
| 2013/0331121 A1 | 12/2013 | Bandyopadhyay et al. | |
| 2013/0332064 A1* | 12/2013 | Funk | G01C 21/165 701/409 |
| 2013/0332065 A1 | 12/2013 | Hakim et al. | |
| 2013/0345967 A1* | 12/2013 | Pakzad | G01C 21/206 701/431 |
| 2014/0002307 A1* | 1/2014 | Mole | G01S 5/0263 342/451 |
| 2014/0162686 A1* | 6/2014 | Lee | H04W 64/003 455/456.1 |
| 2015/0005000 A1* | 1/2015 | Gyorfi | H04W 64/006 455/456.1 |
| 2015/0097731 A1* | 4/2015 | Russell | G01S 19/48 342/450 |
| 2015/0153182 A1* | 6/2015 | Tu | G06F 3/0484 715/771 |
| 2015/0346317 A1* | 12/2015 | Patel | G01S 5/0289 455/456.1 |

OTHER PUBLICATIONS

U.S. Appl. No. 13/616,350, filed Sep. 14, 2012, Bandyopadhyay et al.

U.S. Appl. No. 13/616,370, filed Sep. 14, 2012, Bandyopadhyay et al.

U.S. Appl. No. 13/616,408, filed Sep. 14, 2012, Bandyopadhyay et al.

U.S. Appl. No. 14/262,618, filed Apr. 25, 2014, Funk et al.

U.S. Appl. No. 14/262,627, filed Apr. 25, 2014, Funk et al.

U.S. Appl. No. 61/658,883, filed Jun. 12, 2012, Bandyopadhyay et al.

U.S. Appl. No. 61/783,799, filed Mar. 14, 2013, Karvounis et al.

U.S. Appl. No. 61/783,908, filed Mar. 14, 2013, Funk et al.

U.S. Appl. No. 61/792,856, filed Mar. 15, 2013, Funk et al.

Jolliffe; "Principal Component" 2nd edition; New York; 2002; p. 1-519.

Turk et al.; "Face Recognition Using Eigenfaces"; Vision and Modeling Group; IEEE; 1991; p. 586-591.

Tommasini et al.; "Making Good Features Track Better"; IEEE Computer Vision and Pattern Recognition; 1998; 6 pages.

Thrun et al.; "The Graph SLAM Alogrithm with Applications to Large-Scale Mapping of Urban Structures"; International Journal on Robotics Research; vol. 25 No. 6; 2006; p. 403-429.

Thrun et al.; "A Probabilistic Approach to Concurrent Mapping and Localization for Mobile Robots"; Machine Learning and Autonomous Robots; 31/5; 1998; 25 pages.

Stanley; Implementation of Kalman Filter to Tracking Custom Four-Wheel Drive Four-Wheel-Steering Robotic Platform; Univ or Maryland; Masters Thesis; 2010; 96 pages.

Noguchi et al.; "A SURF-based Spatio-Temporal Feature for Feature-fusion-based Action Recognition" Trends and Topics in Computer Vision; 2012; 14 pages.

Napora; "Implementation, Evaluation, and Applications of Mobile Mesh Networks for Platforms in Motion"; Univ of Maryland; Masters Thesis; 2009; 105 pages.

Mahalanobis; "On the Generalized Distance in Statistics"; Proceedings of the National Institute of Sciences of India; vol. 2 No. 1; Apr. 1936; p. 49-55.

Lemaire et al.; "SLAM with Panoramic Vision"; Journal of Field Robotics; vol. 24 No. 1-2; Feb. 2007; 30 pages.

Jensfelt et al.; "A Framework for Vision Based Bearing only 3D SLAM'"; IEEE Int. Conf. on Robotics and Automation; May 2006; p. 1944-1950.

Harris et al.; "A Combined Corner and Edge Detector"; Proceedings of the 4th Alvey Vision Conference; 1988; p. 147- 151.

Gregory et al.; "Fast and Accurate Collision Detection for Haptic Interaction Using a Three Degree-of-Freedom Force-Feedback Device"; Computational Geometry, 2000; 24 pages.

Whyte; "Uncertain Geometry in Robotics"; IEEE Journal of Robotics and Automation; vol. 4 No. 1; Feb. 1988; p. 23-31.

Davison et al.; MonoSLAM: Real-Time Single Camera SLAM; IEEE Transactions on Pattern Analysis and Machine Intelligence; vol. 29 No. 6; Jun. 2007; 16 pages.

Bouguet; "Pyramidal Implementation of the Lucas Kanade Feature Tracker Description of the Algorithm"; Intel Corporation; 2001; 9 pages.

Bailey et al.; "Simultaneous Localization and Mapping (SLAM); Part II"; IEEE Robotics and Automation Magazine; vol. 13 No. 3; Sep. 2006; p. 108-117.

Chong et al.; "Feature-based Mapping in Real, Large Scale Environments using an Ultrasonic Array"; The International Journal of Robotics Research; vol. 18 No. 1; Jan. 1999; 44 pages.

DeSouza et al.; "Vision for Mobile Robot Navigation: A Survey"; IEEE Transactions on Pattern Analysis and Machine Intelligence; vol. 24 No. 2; Feb. 2002; p. 237-267.

Mourikis et al.; "SC-KF Mobile Robot Localization: A Stochastic Cloning Kalman Filter for Processing Relative-State Measurements"; IEEE Transactions on Robotics; vol. 23 No. 4; Aug. 2007; p. 717-730.

"Parallel Programming and Computing Platform"; www.nvidia.com/object/cuda_home.html; NVIDIA; 2009; accessed Oct. 23, 2012; 4 pages; no authors.

"Developing apps for Windows Phone or Xbox"; http://create.msdn.com; Microsoft; 2012; accessed Oct. 23, 2012; 2 pages; no authors.

"OpenCV (Open Source Computer Vision)"; http://opencv.willowgarage.com; Intel; 2009; accessed Oct. 23, 2012; 2 pages; no authors.

(56) References Cited

OTHER PUBLICATIONS

Teschner et al.; "Optimized Spatial Hashing for Collision Detection of Defromable Objects"; Vision Modeling and Visualization; Korea University; 2003; 39 pages.
Bay et al.; "Speeded-Up Robust Features (SURF)"; Computer Vision and Image Understanding; vol. 110 No. 3; 2008; p. 346-359.
Whyte et al.; "Simultaneous Localization and Mapping: Part I"; IEEE Robotics & Automation Magazine; Jun. 2006; p. 99-108.
Bradley et al.; "Face Tracking and Pose Approximation" Computer Research Association; 2009; 7 pages.
Gregroy et al.; "A Framework for Fast and Accurate Collision Detection for Haptic Interaction"; IEEE Proceedings of Virtual Reality; 1999; 8 pages.
"TRX 3-D Tracking System"; http://www.trxsystems.com; TRX Systems, Inc.; 2009; 2 pages; No Author.
Kabasch; A discussion of the solution for the best rotation to relate two sets of vectors; Acta Crystallographica; vol. 34; Sep. 1978; p. 827-828.

\* cited by examiner

HEADING CONSTRAINTS IN A PARTICLE FILTER

CROSS-REFERENCE TO RELATED APPLICATIONS

This application claims benefit under 35 U.S.C. §119(e) of Provisional U.S. Patent Application No. 61/100,460, filed Jan. 6, 2015, the contents of each of which are incorporated herein by reference in their entirety.

GOVERNMENT RIGHTS

This invention was made with government support under W31P4Q-12-C-0043 awarded by the Defense Advanced Research Projects Agency. The Government has certain rights in the invention.

TECHNICAL FIELD

The disclosure relates generally, but not exclusively, to the correction of location error when tracking a user of a handheld device.

BACKGROUND

The biggest contribution to location error when tracking with low quality sensors, such as those used in smartphones and similar handheld devices, is typically due to errors in the heading of the user being tracked. In a particle filter implementation, each particle represents a possible location solution with system state including, device location, orientation, and other sensor parameters depending on the system being tracked and sensors being used. Constraints can be applied to the particles in the particle filters used for location determination that de-weight particles that are heading in a direction that is different from that indicated by the received sensor data or other inferred heuristic heading information. The difficult part of defining constraints is determining how tight to make them. Tight constraints around the indicated heading are reasonable, if there is high confidence that the indicated heading is correct.

When outside and away from a building (and other magnetic disturbances) compass based heading constraints are highly reliable and tight constraints can be applied to obtain a good heading lock. FIG. 1 illustrates a heading lock obtained in a good magnetic field. The top histogram in FIG. 1 shows the heading distribution of the particles for a person walking northwest towards a building with a path parallel to the building edge. The distribution is tightly centered on the true heading. The bottom of FIG. 1 shows the location distribution of particles. The shading of the particles is indicative of particle weight (higher weights toward the middle and, lower weights toward the outside). Two of the circles overlaying the particle distribution show 1) a location and heading circle—a circle of fixed size centered on the location estimate with a line to the perimeter indicating the heading estimate, and 2) the circular error probability (CEP) particle error—a circle containing 50% of the particles.

When in or around buildings or vehicles or other sources of magnetic fields, however, compass based heading constraints are not as reliable and tight constraints are difficult to apply.

SUMMARY

In urban and suburban areas, in and around buildings or vehicles, disturbances to the magnetic field can cause significant heading errors. Using information on expected magnetic magnitude and inclination as well as data from inertial sensors, confidence on the reliability of the magnetic heading on a measurement by measurement basis may be provided. Using this information, a compass may be restricted to remove incorrect heading data. Applying restrictions too strictly can lead to providing no heading information indoors or around buildings. In order to get some amount of information in places with many magnetic disturbances, a variable method is described herein that will provide strict corrections when highly reliable heading information is consistently available and apply weaker corrections upon receiving isolated points of decent quality.

DETAILED DESCRIPTION OF ILLUSTRATIVE EMBODIMENTS

Figure 1:
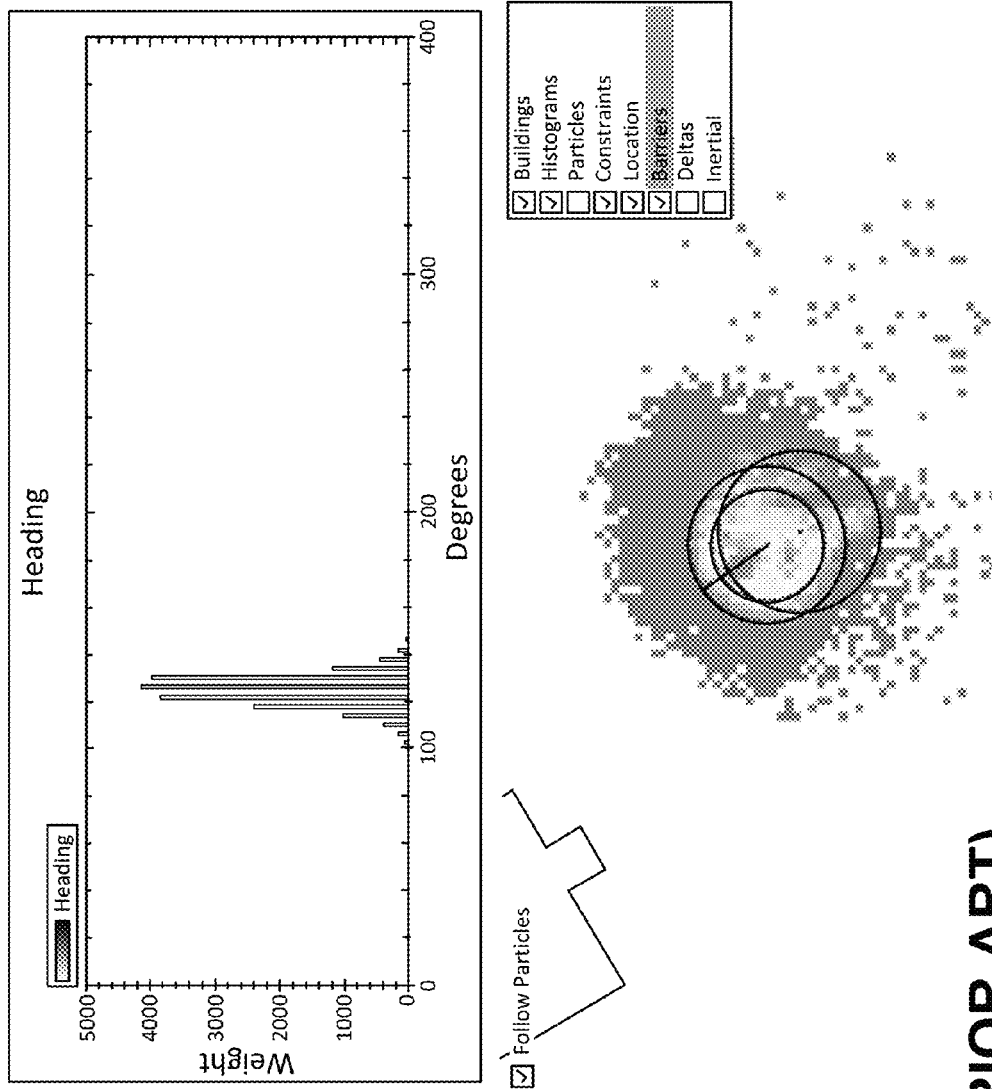
FIG. 1 is a PRIOR ART diagram of a heading lock determined for a portable device outside of a building based on a good magnetic field.
Figure 2:
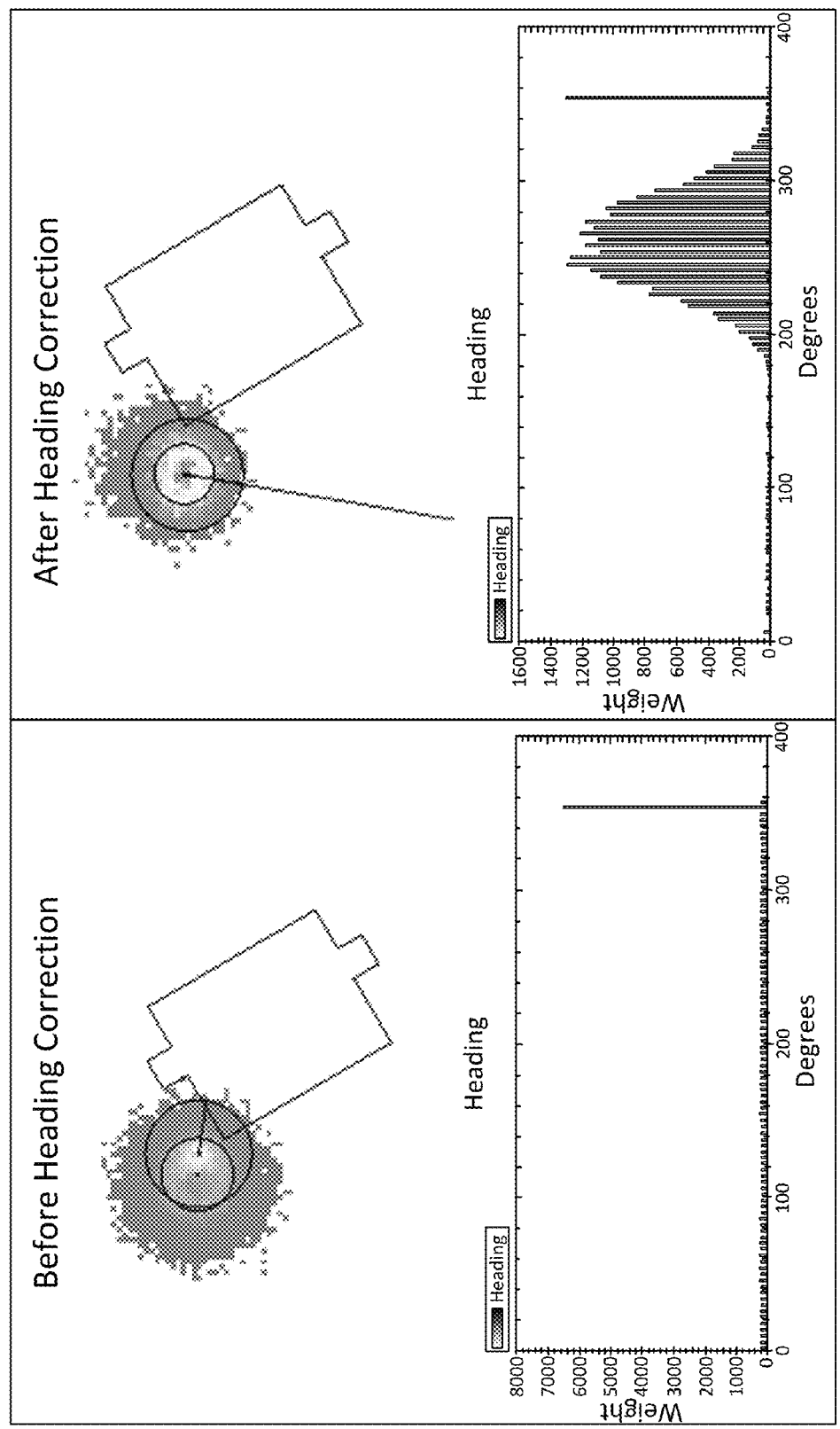
FIG. 2 is an illustration of two examples of headings before and after correction in accordance with an embodiment.

FIG. 2 illustrates the particle location distribution (top of each example) and particle heading distribution (bottom of each example), just before (left example) and just after (right example) a weak heading correction is performed in accordance with an embodiment as described herein. The two circles overlaying each of the particle distributions show 1) a location and heading circle—a circle of fixed size centered on the location estimate with a line to the perimeter indicating the heading estimate, and 2) the circular error probability (CEP) particle error—a circle containing 50% of the particles.

In FIG. 2, the tracked person is near a building and the heading estimate show in the example on the left is incorrect due to poor global position system (GPS) data. The application of a weak heading correction is able to improve both the particle heading distribution and particle location distribution relative to ground truth, as illustrated in the example on the right.

Figure 3:
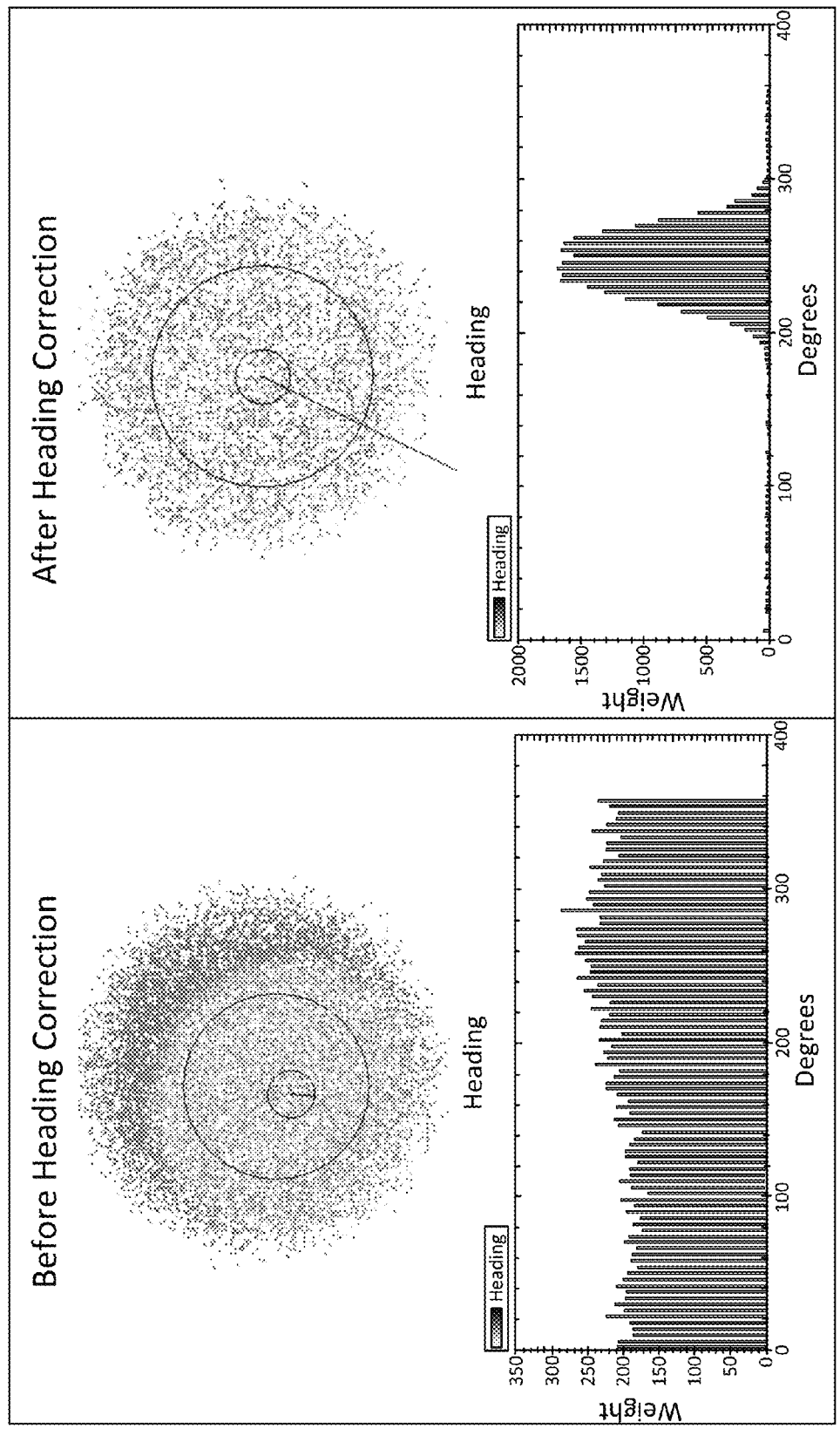
FIG. 3 is an illustration of two examples of particle distribution for headings before and after correction in accordance with an embodiment.

In the FIG. 3, the tracked person has received only weak network constraints providing weak location information and minimal information on the heading (i.e., note the heading distribution in the example on the left is almost uniform [0,360]). Application of a weak heading correction in the example on the right is able to improve both the heading and particle location distribution.

The methods described herein are able to improve the ability to obtain a heading lock close to a building or other magnetic field sources without getting erroneous heading constraints, although the lock is not as tight as one that can be obtained away from magnetic disturbances.

Obtaining heading locks indoors or close to magnetic disturbances from a compass is often not possible because of the many compass disturbances that exist in such environments. As such, automated methods described herein have been developed to help remove heading errors from the system using other information. If a building outline is available, the outline information can be used to improve the estimate of the device location and heading by decreasing the weighting of particles which don't "make sense" given other computed information based on the outline. Two embodiments of weighting particles to improve heading are described herein.

Indoor/Outdoor Based Constraints

One embodiment is based on computing the probability that the device is indoors. Based on a confidence that the device is indoors, the probability of particles falling outside of the building outline may be decreased and vice versa. This weighting can improve both location and heading lock.

The weighting is implemented by multiplying particle weight by an indoor/outdoor factor depending on particle location. The factor computation is based on five sensor based inputs:

1) GPS SNR (signal to noise ratio), e.g., SNR is lower indoors,
2) GPS satellite elevation, e.g., the elevation angles of the satellites near the horizon would be indicative of being indoors, whereas more overhead satellites would be indicative of being outdoors,
3) Light, e.g., the intensity and other characteristics of light changes indoors,
4) Magnetic field variance, e.g. the variance over distance traveled is higher indoors, and
5) Cell phone signal levels, e.g., signal levels are generally lower indoors.

Each of the inputs provides a score in the interval [−1,1] where −1 indicates that device is inside, +1 indicates the device is outside and 0 indicates ambivalence with respect to the given sensor data. Thresholds used are learned over time for each building based on the measured data for a particular building. Threshold adaptation is needed, for example, with cell signal levels because some buildings have good cell coverage and others have none so there is no universal threshold that will work.

TABLE 1

| Building Constraint Daylight | |
| --- | --- |
| inFactor: | 1.000000 |
| outFactor: | 0.510000 |
| lightSource: | −1.000000 |
| magSource: | −1.000000 |
| elvScore: | 0.000000 |
| snrSource: | 0.000000 |
| cellSource: | 0.000000 |

Table 1 shows some sample building constraint information from an example test. Both light and magnetic sensor data indicate strongly that the test subject is indoors, whereas, the cell and GPS based scores are 0 providing no information. In the test, for GPS, a minimum set of satellite information was required in the tracking session to confirm that GPS was on and working properly and no GPS information was available. In the test, for cell phone signals, because the test was started indoors and no a priori learned cell thresholds for the building were stored, insufficient information was available to make a determination. Based on only the light and magnetic sensor information, the weight on outdoor particles could be decreased by 0.51 making it twice as likely that the person was indoors.

Figure 4A:
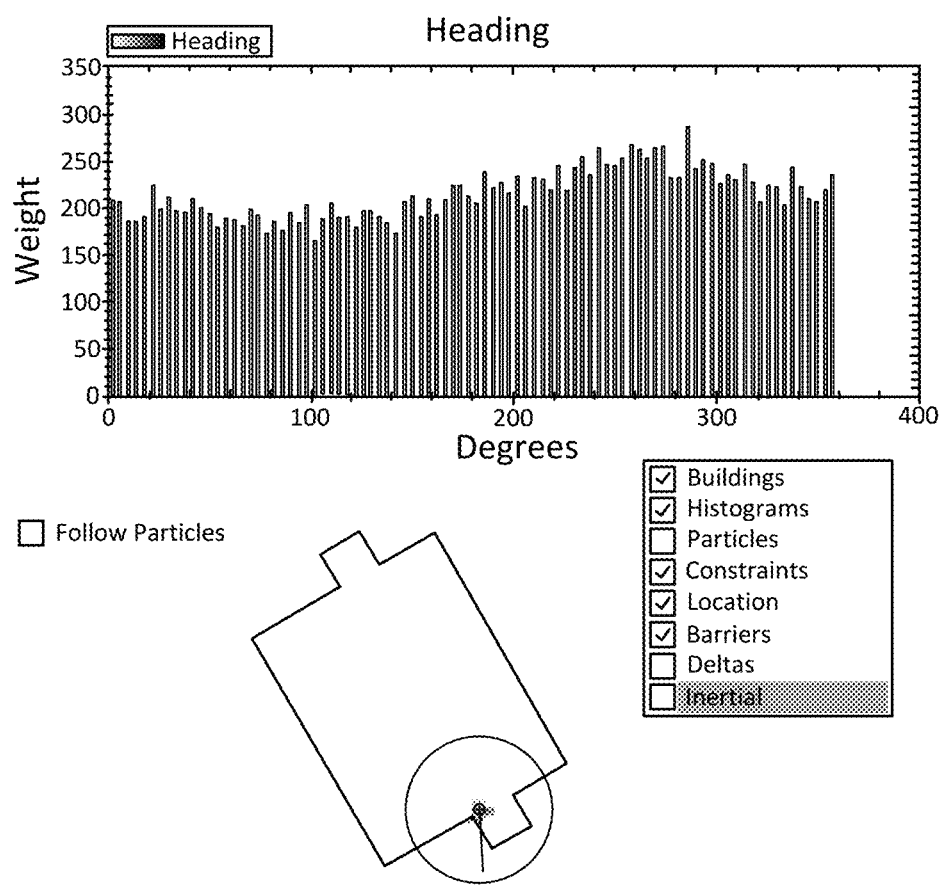
FIGS. 4A, 4B and 4C are illustrations of headings with indoor and outdoor building constraints applied during daylight in accordance with an embodiment.
Figure 4B:
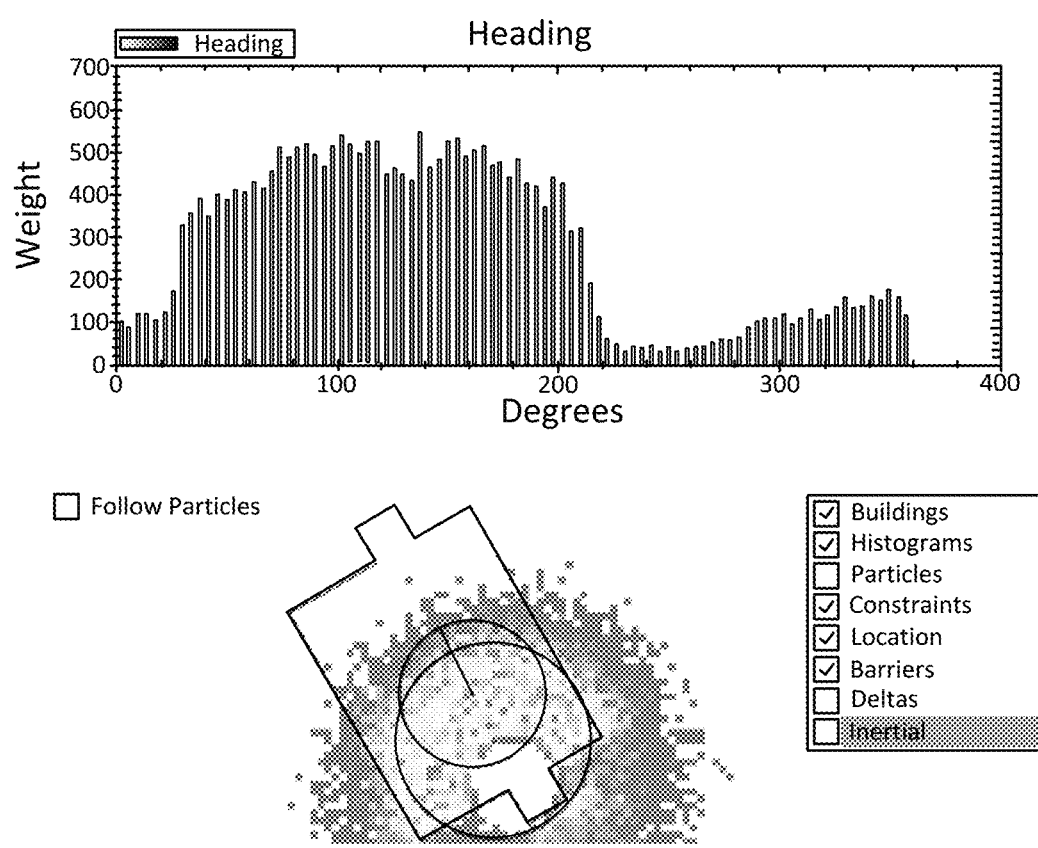
Figure 4C:
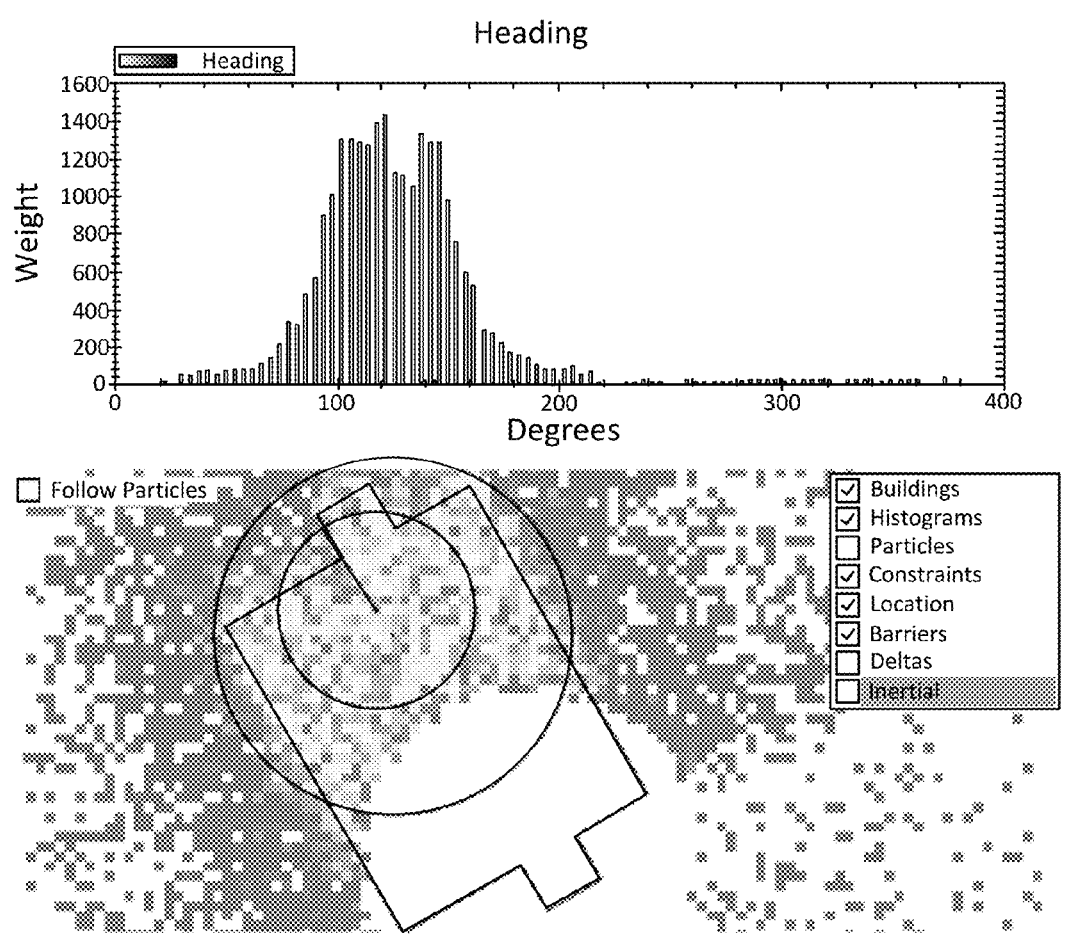

FIGS. 4A, 4B and 4C show a series of images from the same example test. In the test, the subject starts indoors by checking-in (FIG. 4A). At the check-in there is no heading information; note the nearly uniform distribution of particle headings. Figures FIGS. 4B and 4C show that by simply walking down the hall once (without any compass constraints) it may be possible to refine the test subject's heading as the particles outside were de-weighted.

TABLE 2

| Building Constraint Evening | |
| --- | --- |
| inFactor: | 1.000000 |
| outFactor: | 0.843333 |
| lightSource: | 0.000000 |
| magSource: | −1.000000 |
| elvScore: | 0.000000 |
| snrSource: | 0.000000 |
| cellSource: | 0.000000 |

Figure 5A:
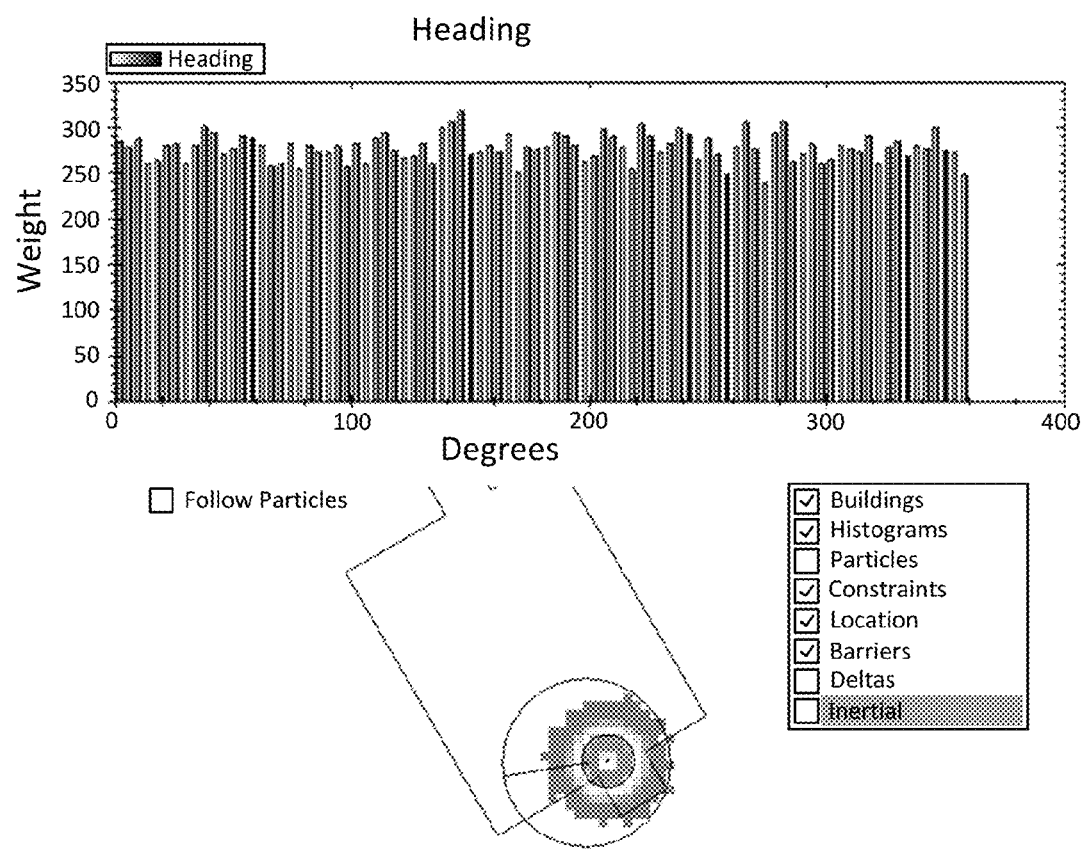
FIGS. 5A, 5B and 5C are illustrations of headings with indoor and outdoor building constraints applied during evening in accordance with an embodiment.
Figure 5B:
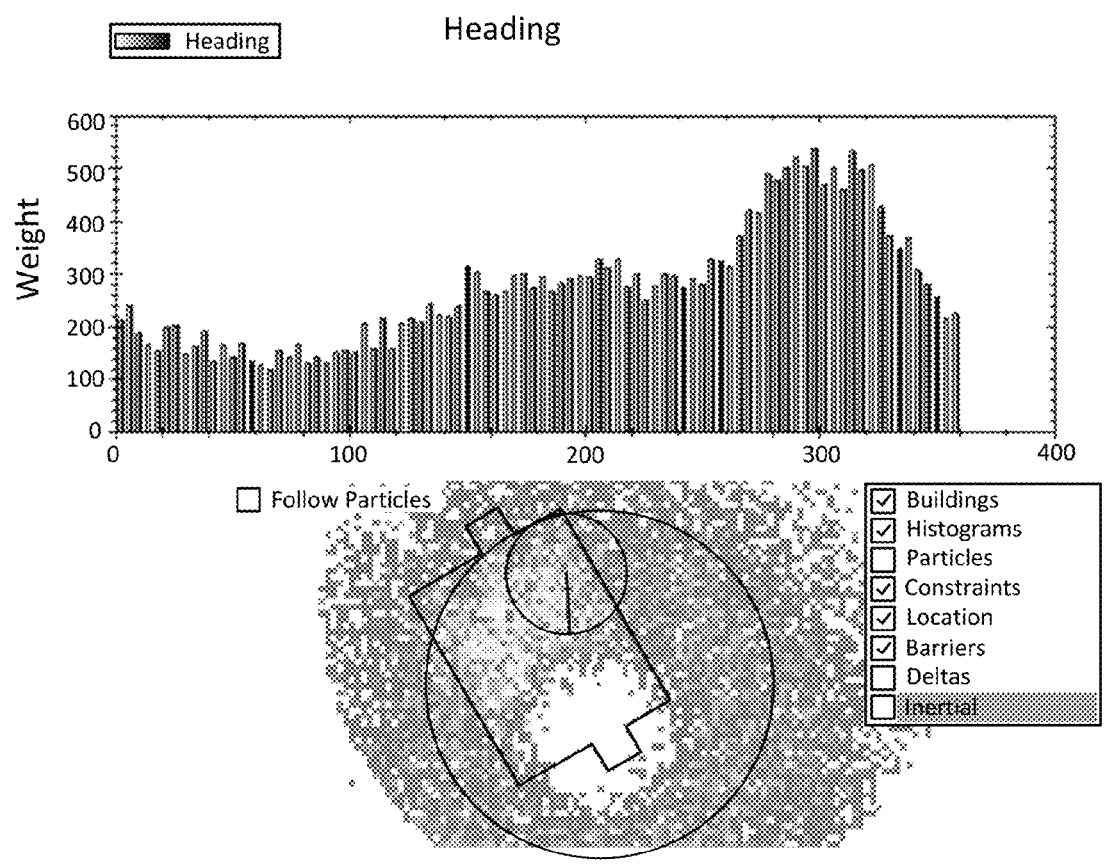
Figure 5C:
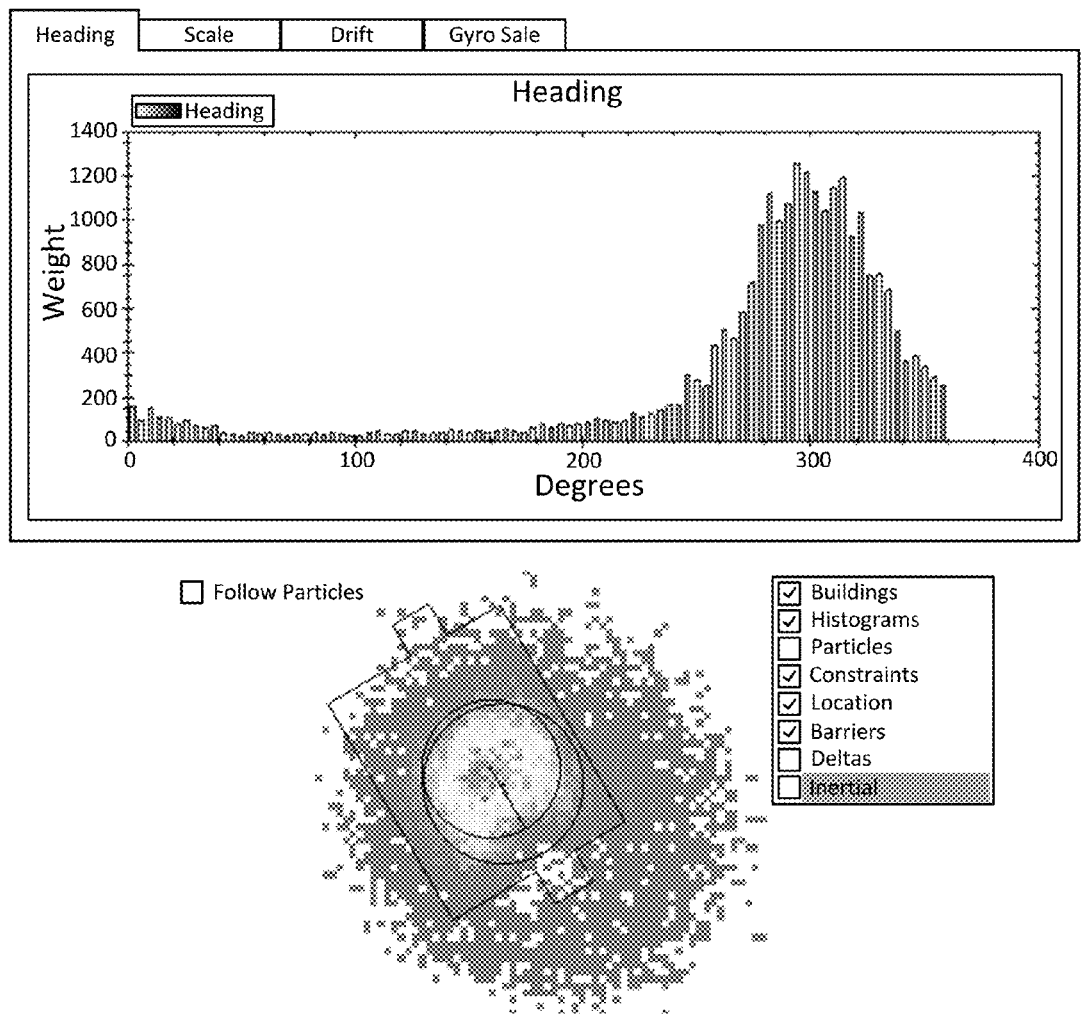

FIGS. 5A, 5B and 5C show a similar series of images from a test subject walking the same course, however, the test is taken in the evening. Again, the test subject starts indoors by checking-in (FIG. 5A) and again, at the check-in there is no heading information. Because of the time of day, the light sensor also provides no information, so the in and out factors are based solely on the magnetic sensor information. In this case, as shown in Table 2, the weight on outdoor particles was decreased by only 0.84, making it only slightly more likely that the person was indoors. Because de-weighting is less significant in this test, by the time the test subject has walked the length of the building (FIG. 5B), ~35 m, not much information on heading was obtained. As the subject walks further (FIG. 5C), a decent heading lock could be obtained.

The above embodiment may be further improved, i.e., provide faster and tighter heading locks in buildings, by using building grid information as further described below.

Figure 6A:
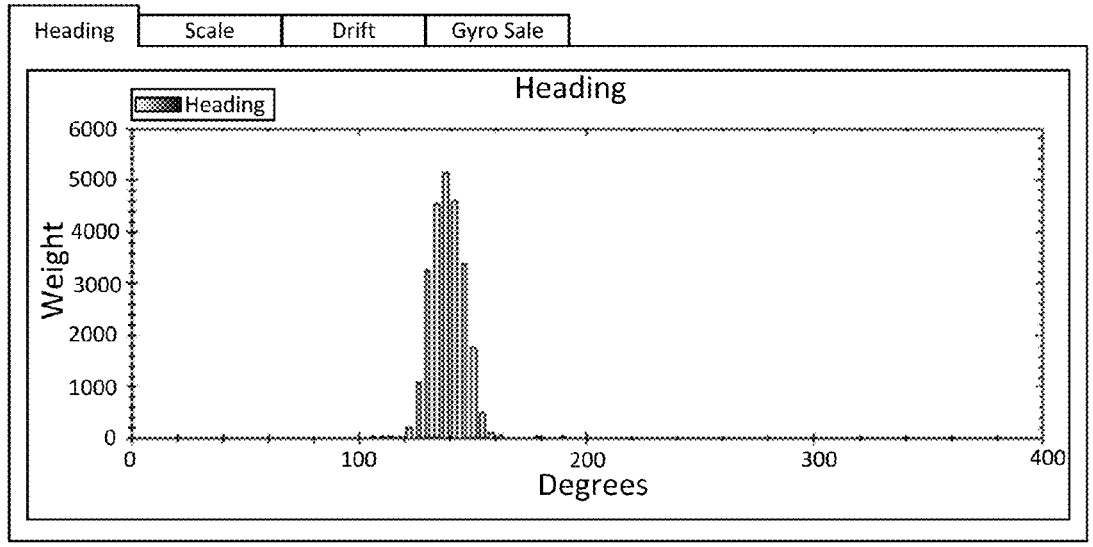
FIGS. 6A, 6B and 6C are illustrations of headings when approaching and entering a building.
Figure 6A:
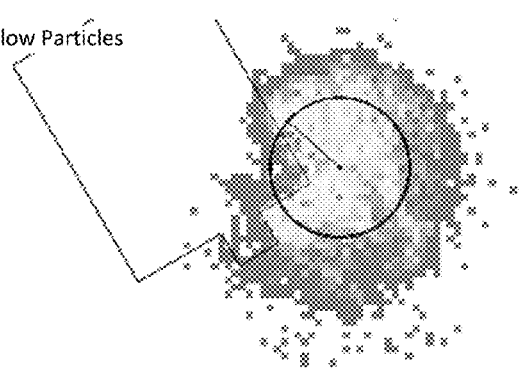
Figure 6B:
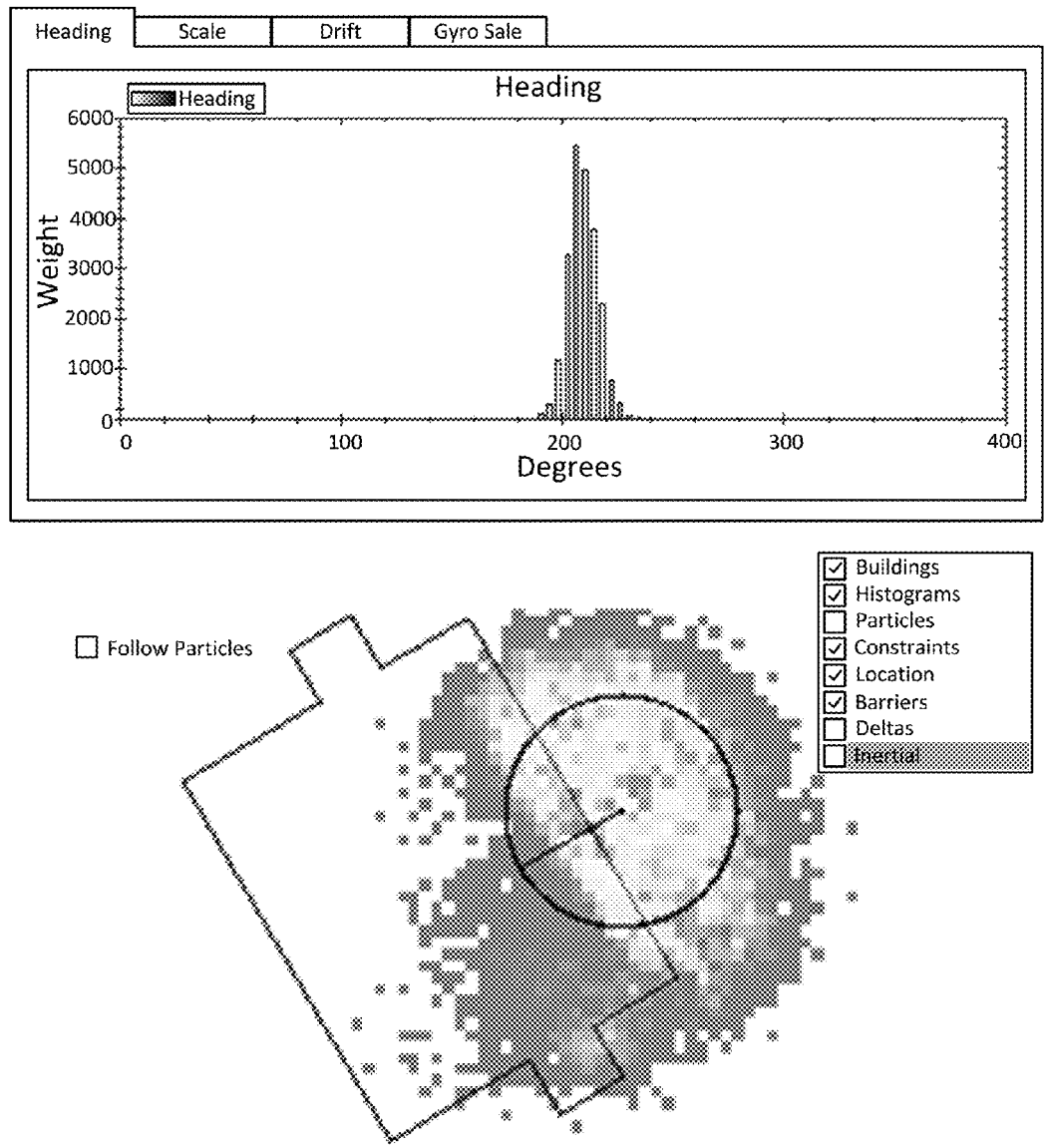
Figure 6C:
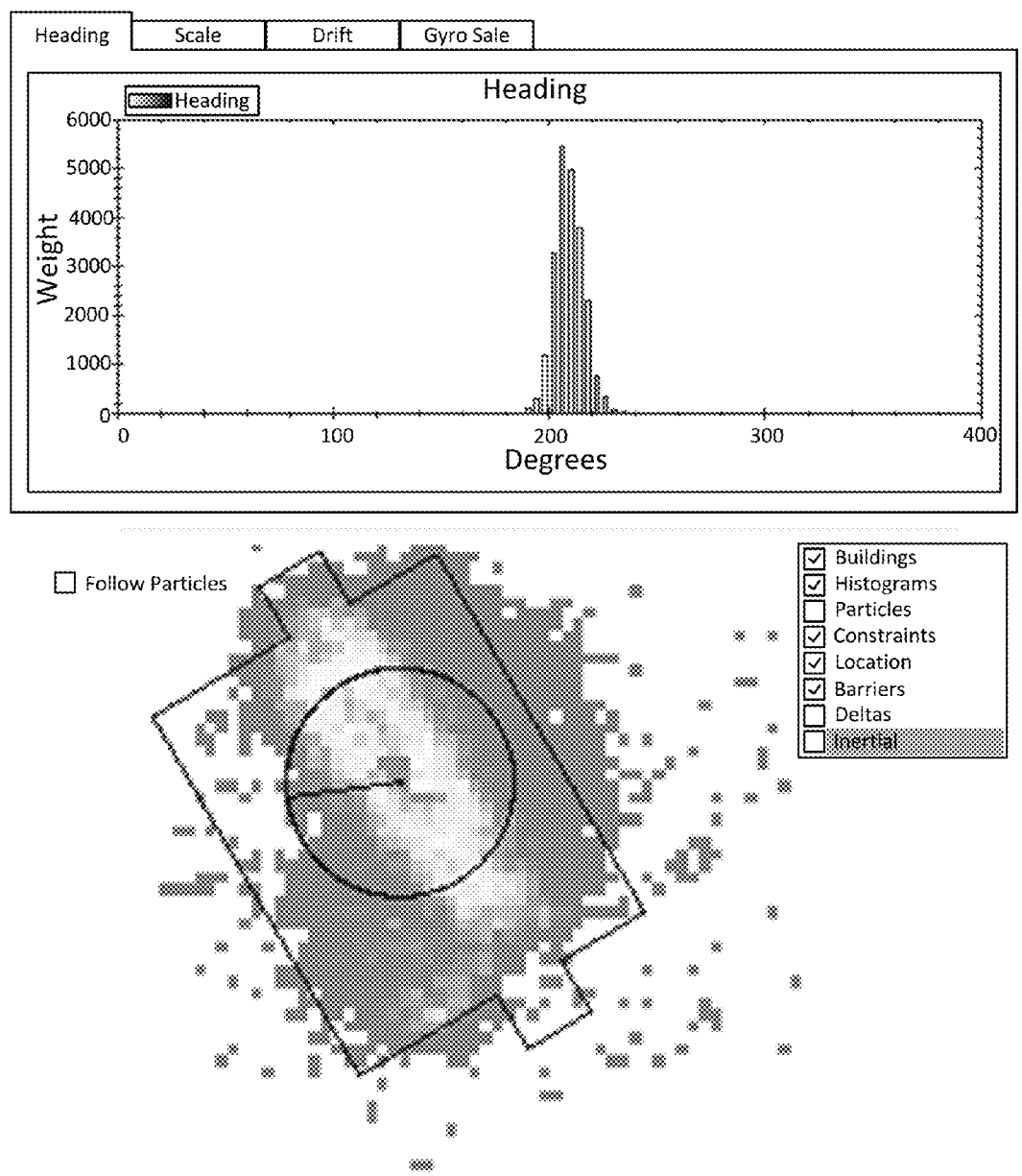

The indoor/outdoor weighting can also help improve tracking performance when approaching and entering a building. FIGS. 6A, 6B and 6C show an example test where the subject starts outside away from the building (FIG. 6A) and then approaches (FIG. 6B) and enters the building (FIG. 6C). In the test, because sensor data indicates that it is likely that the subject being tracked is outdoors, the weight on indoor particles is decreased by 0.54, making it twice as likely that the person is outdoors. As the test subject enters the building, and sensor data indicates that the subject is indoors, the weight on outdoor particles is decreased by 0.25 making it four times as likely that the person is indoors (Table 3). This has noticeable effect of concentrating particles and thus improving location and heading confidence.

TABLE 3

Building Constraint on Transition

| Outdoor | | Indoor | |
| --- | --- | --- | --- |
| inFactor: | 0.535782 | inFactor: | 1.000000 |
| outFactor: | 1.000000 | outFactor: | 0.251012 |
| lightSource: | −0.077347 | lightSource: | −1.000000 |
| magSource: | 1.000000 | magSource: | −0.553927 |
| elvScore: | 1.000000 | elvScore: | −1.000000 |
| snrSource: | 1.000000 | snrSource: | −1.000000 |
| cellSource: | 0.000000 | cellSource: | 0.000000 |

Indoor/Outdoor Implementation

As discussed above, the purpose of the indoor/outdoor detector is to help correct device location and heading based on known information about the outlines of buildings in the area. The algorithms use a combination of sensor data to make a decision of whether a tracked device is indoors or outdoors, coupled with a confidence level. This information is passed to a Navigation Engine, which weights candidate location and heading solutions based on their agreement with the indoor/outdoor detector. The result is a narrowed solution space, which helps the particle filter to converge. In the sections below, details are provided on how the scores are generated from the sensor data.

Indoor/Outdoor Raw Sensor Scores

In an embodiment, an IndoorOutdoorManager class implemented in JAVA code is employed to monitor sensors associated with the tracked device and to compute one or more indoor/outdoor scores for each sensor. The IndoorOutdoorManager also monitors the device's travel distance in order to determine spatial variation of data, for example when computing the Magnetic Score (as further described below). Upon receiving information that the device's position has changed, the IndoorOutdoorManager transmits a message containing the computed sensor scores. These raw scores are further processed as described below.

Light Score

During daylight hours, the tracked device's, such as an Android device, light sensor may be a good indicator for whether the device is indoor/outdoor, as light intensity and the type of light can change significantly when the device is moving from outdoors to indoors, and vice versa, as the device's light sensor readings tend to be significantly higher when the device is outside during the day. At night, light readings tend to be higher indoors, although depending on outdoor lighting in the area the difference may not be as significant.

To handle light variation over the day, algorithms may be modified to account for the time at which sensors are being read relative to sunset/sunrise information for the device's location. For example, sunset/sunrise times for specific locations can be found online. In an embodiment, the light sensor was enabled with some threshold time after sunrise and disabled at some threshold time before sunset.

Additionally, on certain types of devices, such as smart phones, a proximity sensor may be used to determine whether the light sensor is covered in some way, such as when the device is placed in a pocket, bag or purse. Under such circumstances, the light sensor may be disabled whenever the proximity sensor is activated, since this indicates that the light sensor may be obstructed.

In an embodiment, a higher Light Score may represent a higher probability of being outside, while a Light Score of −1.0 may mean that the light sensor is disabled, such that the Light Score is not to be used.

Magnetic Score

As the tracked device moves indoors, the magnetometer reading will likely be influenced by magnetic anomalies and by the metal frame of the building. This causes fluctuations in the magnetic field readings, which increases the variance of the field magnitude. In an embodiment, the variance of the magnitude of the magnetic field may be monitored over distance as the device moves. To determine the distance traveled, X and Y location values may be computed by the navigation engine. The X and Y location may be based on, for example, pedometer, wheel counter, inertial integration, image data, or other methods of tracking motion. A running count of the variance of the magnetometer readings may be kept and this variance may be scaled by the inverse of the distance traveled over the time interval. A dynamic buffer may be used to track the total variance over, for example, the last 10 meters traveled. Higher scores may therefore indicate that the device is more likely indoors. A score of −1.0 may mean that the 10 meter buffer has not yet been filled, such that the Magnetic Score cannot be used.

GPS Elevation Score

Two scores based on GPS availability may also be considered. The first GPS score may be based on the average elevation of satellites that have a good signal-to-noise ratio (SNR). When the device is outside, the GPS receiver may be able to get a fairly good signal from satellites with a higher elevation (directly overhead). As the device transitions inside, the signal from higher elevation satellites tends to degrade quickly, while lower elevation satellite signals persist. The GPS Elevation Score (Elvation (Elv) Score) is also on a scale from 0.0 to 1.0, with higher numbers corresponding to a higher outdoor probability. A score of −1.0 means that there are not enough visible satellites to get a meaningful elevation ratio.

GPS SNR Score

The second GPS score may be based solely on the SNR of visible satellites. If the average SNR is high, the device is more likely to be outside. This score follows the same scale as the GPS Elevation Score of 0.0 to 1.0, with higher numbers indicating a high outdoor probability. Again, −1.0 means that there are not enough visible satellites to get a meaningful ratio.

Cell Score

The received signal strength indication (RSSI) for a cellular phone device tends to decrease when the tracked device is indoors. However, the absolute signal level varies greatly between different phone models, carriers, and environments. If cell signal strength maps were available by carrier and potentially also by phone model, that data may be utilized. Since such maps are not always available, a dynamic threshold based on the signal availability, as described below, may be used instead. The Cell Score follows a scaled score from 0.0 to 1.0, indicating the cell signal strength. A score of −1.0 means the signal strength is unavailable.

The Cell Score may not be available for use for indoor/outdoor determination until sufficient RSSI samples, for example 20, have been collected in both an indoor and an outdoor environment in a current tracking session. In such as case, the cell RSSI of the previous 20 "Indoor" classifications for the current session and the previous 20 "Outdoor" classifications for the current session may be stored. As average of each of these buffers may be stored for use as thresholds for the Cell Score. For example, if the current cell RSSI is higher than the average RSSI for the last 20 "Outdoor" points, the device is likely outdoors. Inversely, if the current RSSI is lower than the average of the last 20

"Indoor" points, the device is likely indoors. Because of the dynamic scoring, the thresholds may adjusted if the device enters a building that has good cell reception.

Higher Level Navigation Processing

The IndoorOutdoorManager collects the indoor/outdoor scores for each category described above and aggregates them. The scores are first normalized and thresholded individually as follows:

- −1.0 corresponds to high indoor probability
- +1.0 corresponds to high outdoor probability
- 0.0 means the score is uncertain or unavailable.

A weighted average of the scores may then be computed to determine the final indoor/outdoor decision. The result may be averaged over a few seconds to help account for random variations in the scores. If the average is significantly positive or negative a Building Constraint may be applied.

The Building Constraint may have two parameters: an inFactor and an outFactor. As illustrated in the tables above, one of these factors will always be 1.0, and the other factor will be less than 1.0:

- If the inFactor is 1.0, the decision is that the device is Indoors. Accordingly, all particles that ARE NOT within a building outline may have their weight multiplied by the outFactor. A smaller outFactor corresponds to a higher indoor confidence.
- If the outFactor is 1.0, the decision is that the device is Outdoors. Accordingly, all particles that ARE within a building outline may have their weight multiplied by the inFactor. A smaller inFactor corresponds to a higher outdoor confidence.

Building Grid

Figure 7:
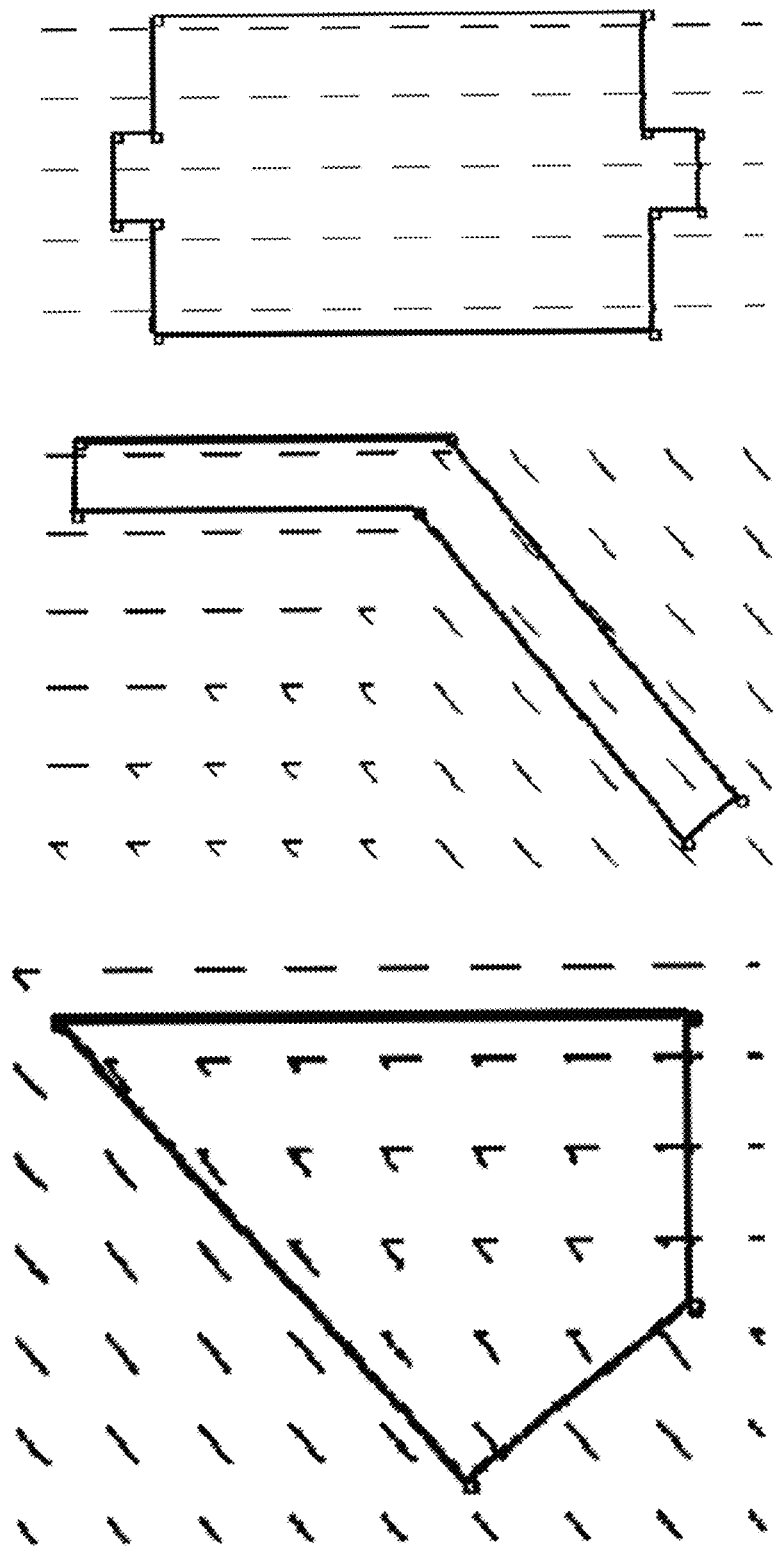
FIG. 7 is an illustration of grid axis for different buildings.

In an embodiment, by relying only on building outline information, a determination may be made regarding the most probable building grid directions. A majority of buildings are rectangular in shape, so they tend to have two perpendicular grid directions. More oddly shaped buildings may have most probable grid directions that change as a function of location. FIG. 7 shows some example building outline shapes with the major grid lines denoted by overlays. Secondary, perpendicular grid lines are not shown. In some sections of the irregularly shaped buildings there may be two possible grids with different probabilities. The grid lines are sized to show the probability of each grid. Notice that in irregular buildings, the probability of a grid direction decreases with distance from a wall.

When a tracked device is moving in a straight path of significant length (what is "significant" will depend on building dimensions), the probability that the tracked device is moving along one of the grid directions should increase as a function of path length.

Accordingly, a mechanism is disclosed for automatically computing the most probable building grid directions and increasing the probability (weight) of particles with heading along the computed grid directions. Grid prioritization, the increased weighting of particles along the grid, may improve the heading lock result and produce a tighter lock.

FIGS. 8A, 8B, 9A and 9B illustrate the headings for the two indoor test paths of FIGS. 4B and 4C and FIGS. 5B and 5C, respectively, in day and night conditions, when the particles are weighted based on grid prioritization. The heading results in daylight conditions without grid correction are shown in FIGS. 4B and 4C and with grid correction in FIGS. 8A and 8B. The heading results in evening conditions without grid correction are shown in FIGS. 5B and 5C and with grid correction in FIGS. 9A and 9B.

The top histograms in each of FIGS. 4B, 4C, 5B, 5C, 8A, 8B, 9A and 9B show the heading distribution of the particles. The bottom illustration shows the location distribution of particles. The shading of the particles is indicative of particle weight (higher weights tend to be lighter shades closer to the inside of the circles and lower weights tend to be darker shades outside of the circles). The two circles overlaying the particle distribution show 1) a location and heading circle—a circle of fixed size centered on the location estimate with a line to the perimeter indicating the heading estimate, and 2) the CEP particle error—a circle containing 50% of the particles.

Figure 8A:
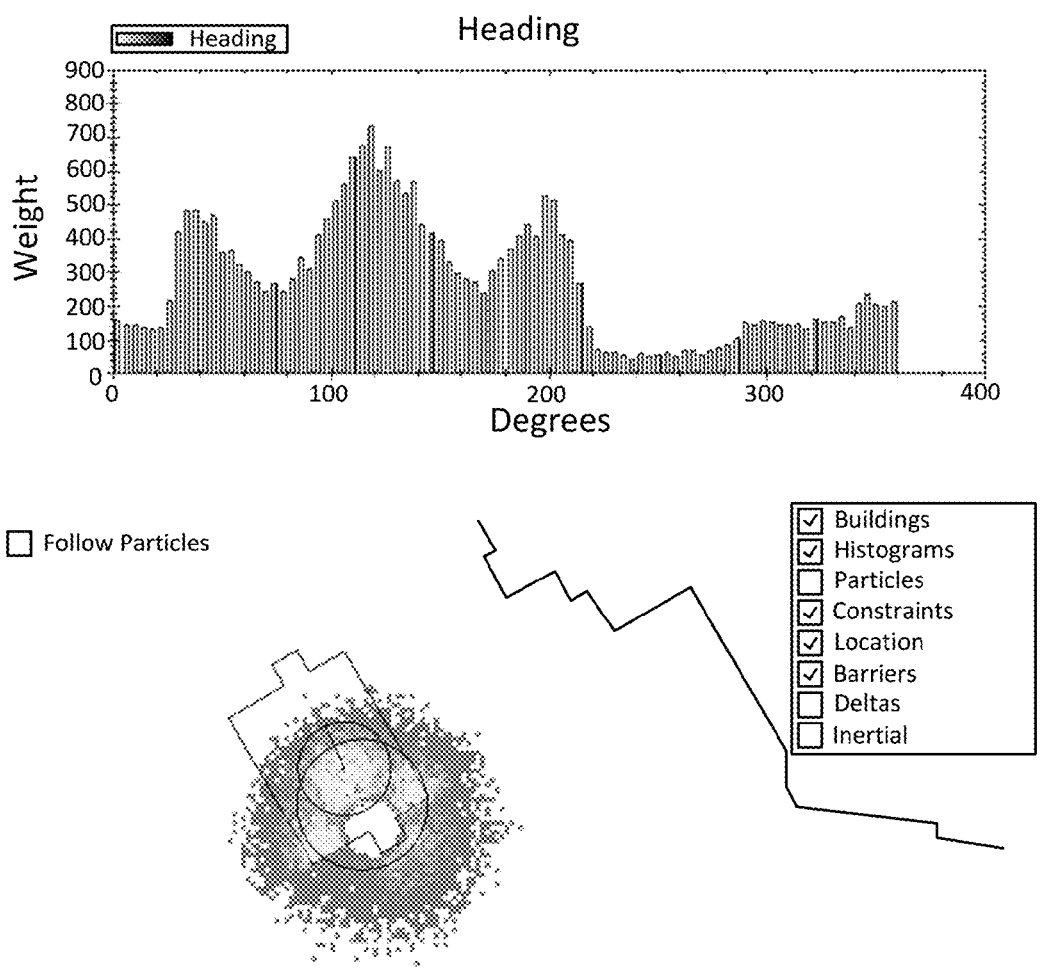
FIGS. 8A and 8B are illustrations of the headings of FIGS. 4B and 4C with grid polarization added in accordance with an embodiment.
Figure 8B:
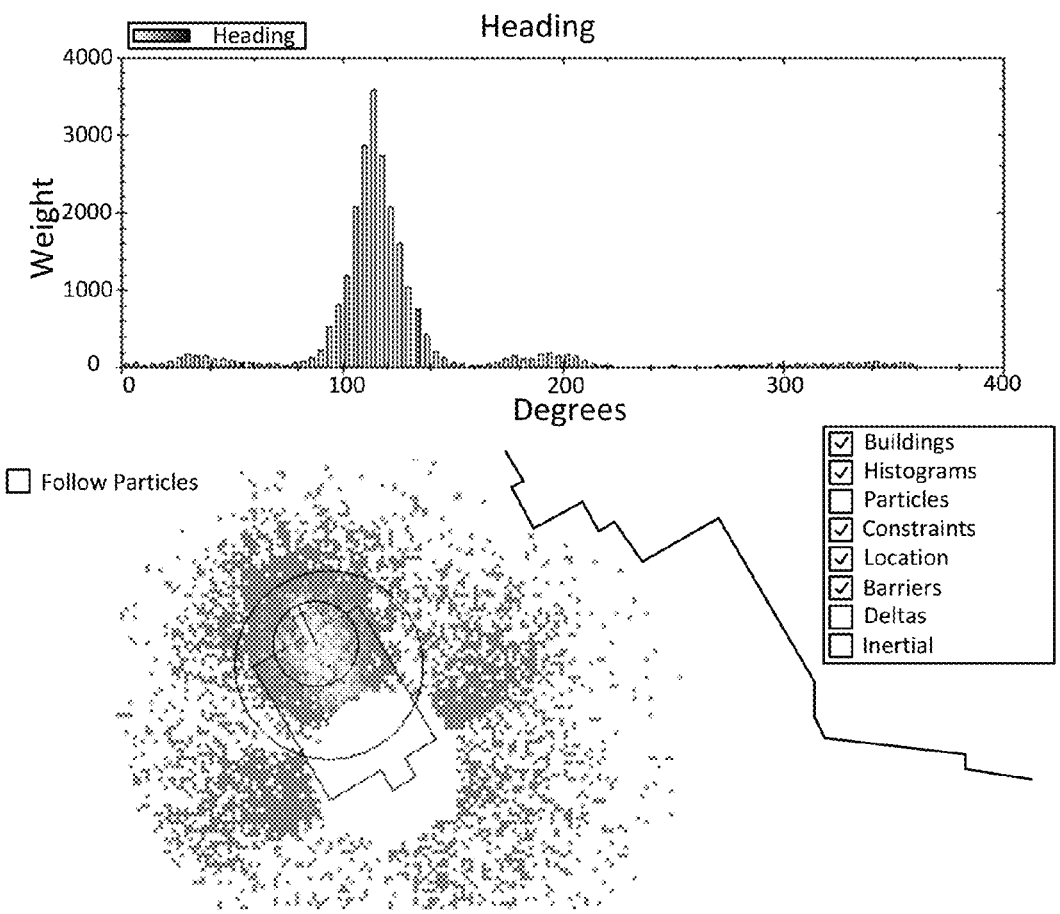

In the first test (FIGS. 4A, 4B and 4C without grid correction and FIGS. 8A and 8B with grid correction added), the subject starts indoors by checking-in (FIG. 4A). At the check-in there is no heading information as noted by the nearly uniform distribution of particle headings. FIGS. 4B and 4C show that by simply walking down the hall once (without any compass constraints), it was possible to refine the test subject's heading as the particles outside are de-weighted and FIGS. 8A and 8B show that headings may be further refined as the particles that do not lie along the grid are de-weighted as the path length increases.

Figure 9A:
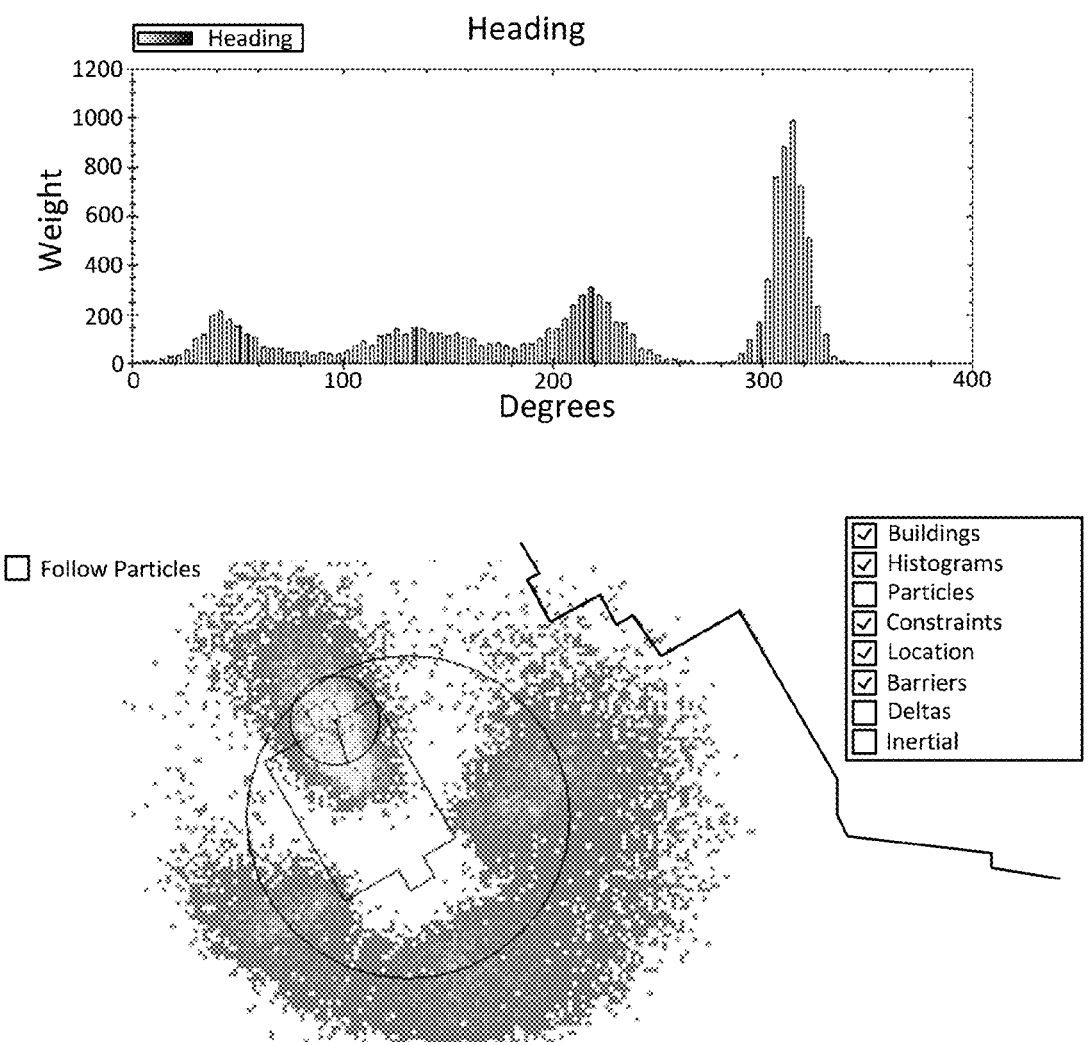
FIGS. 9A and 9B are illustrations of the headings of FIGS. 5B and 5C with grid polarization added in accordance with an embodiment.
Figure 9B:
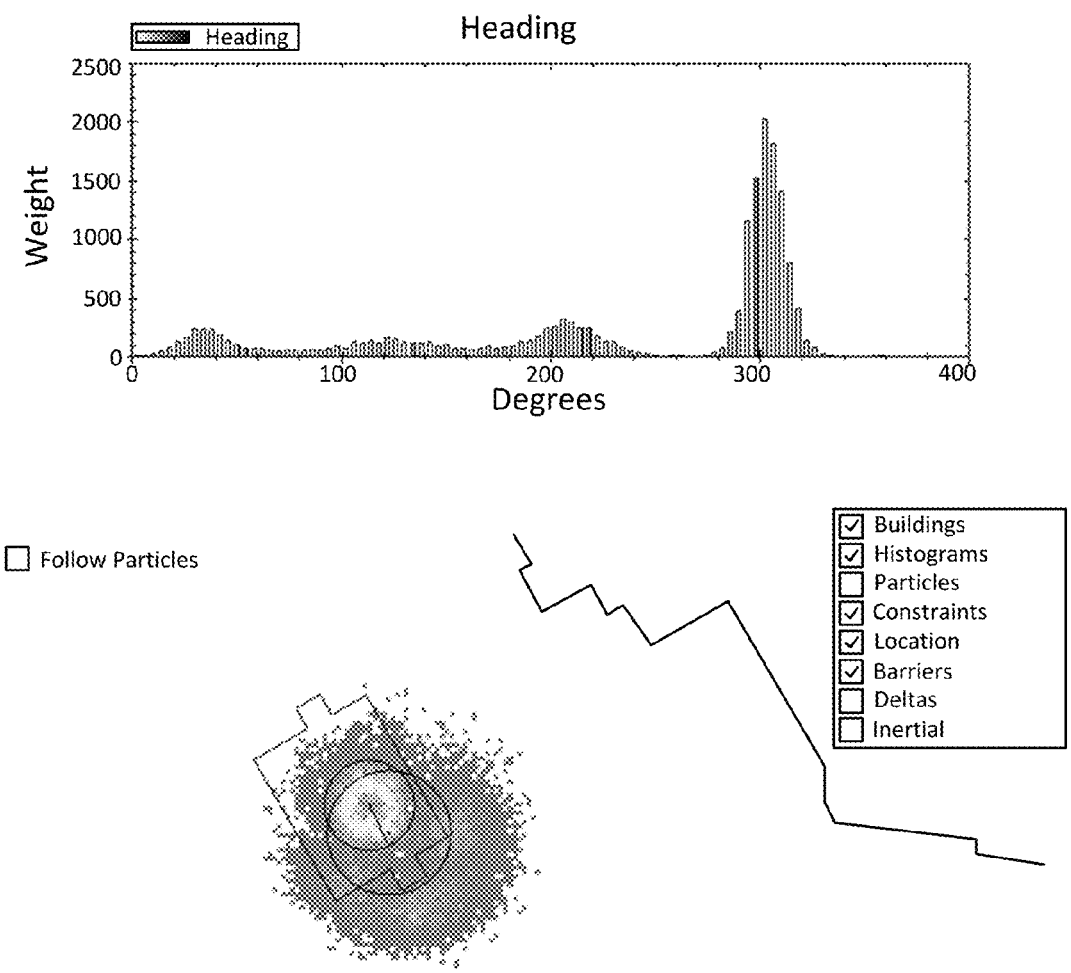

In the second test (FIGS. 5A, 5B and 5C without grid correction and FIGS. 9A and 9B with grid correction added), a similar series of images are show as the test subject checks-in and walks a similar course in the evening, when indoor/outdoor indicators are less certain. Again, the test subject starts indoors by checking-in (FIG. 5A) and again, at the check-in there is no heading information. Because of the time of day, the light sensor provides no information and, recall, because GPS information is not being used, the in and out factors are based solely on the magnetic sensor information. In this case, the weighting on outdoor particles may be decreased by only 0.84 making it only slightly more likely that the tracked device is indoors. Because de-weighting is less significant, by the time the test subject has walked the length of the building (FIG. 9A), ~35 m, not much information on heading was obtained. However, when using grid correction, it is possible to obtain a good heading lock after simply walking down the hall once. As the subject walks further, a decent heading lock is obtained even without grid correction, as illustrated by FIGS. 5C and 9B.

The present disclosure describes particular embodiments and their detailed construction and operation. The embodiments described herein are set forth by way of illustration only and not limitation. Those skilled in the art will recognize, in light of the teachings herein, that there may be a range of equivalents to the exemplary embodiments described herein. Most notably, other embodiments are possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Figure 10:
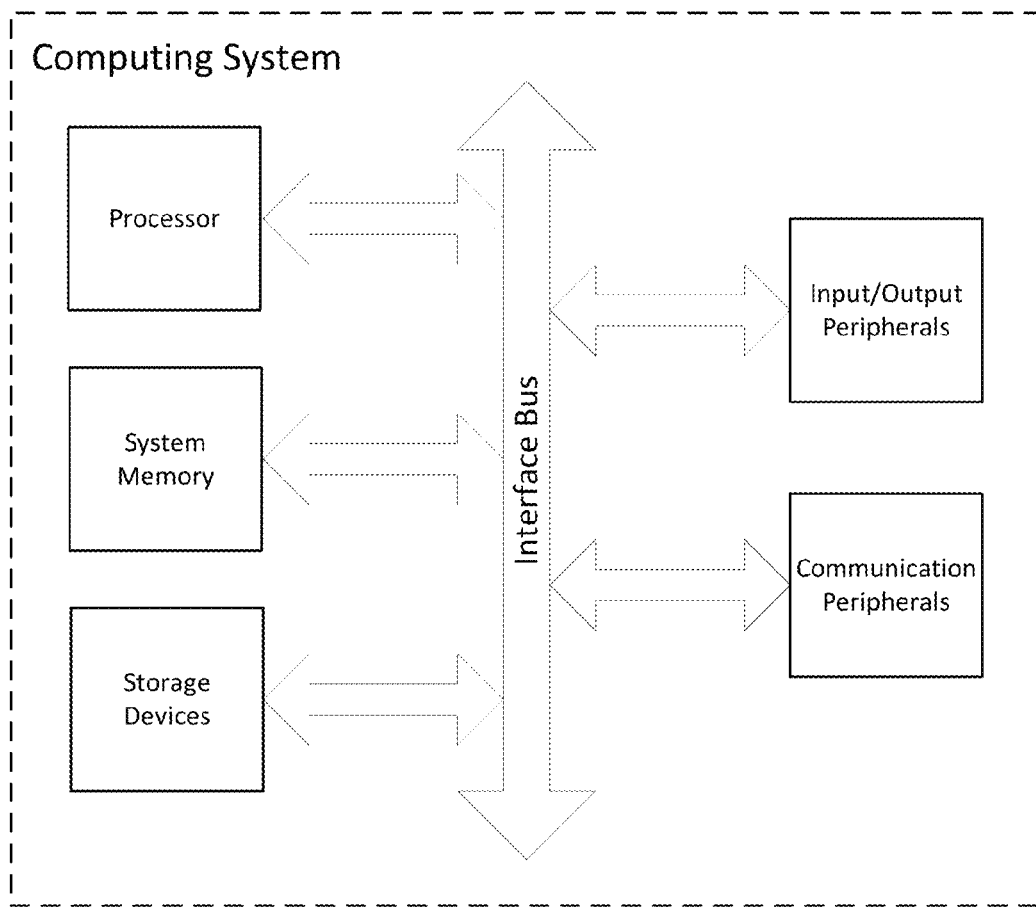
FIG. 10 is an illustration of an exemplary block diagram representing a general purpose computer system in which aspects of the methods and systems disclosed herein or portions thereof may be incorporated.

The techniques described above can be implemented on a computing device associated with a user (e.g., gyroscope and accelerometer sensors implemented on a device worn or carried by the user), a plurality of computing devices associated with a plurality of users, a server in communication with the computing device(s) (e.g., a server configured to calibrate the gyroscope and accelerometer sensors of the device worn or carried by the user), or a plurality of servers in communication with the computing device(s). Additionally, the techniques may be distributed between the computing device(s) and the server(s). For example, the computing device may collect and transmit raw data to the server that, in turn, process the raw data to improve heading estimation. FIG. 10 illustrates an exemplary block diagram of a computing system that includes hardware modules, software module, and a combination thereof and that can be implemented as the computing device and/or as the server.

In a basic configuration, the computing system may include at least a processor, a system memory, a storage device, input/output peripherals, communication peripherals, and an interface bus. Instructions stored in the memory may be executed by the processor to perform a variety of methods and operations, including the indoor/outdoor detector or indoor/outdoor manager and the navigation engine as described above. The computing system components may be present in the device worn or carried by the user, in a server or other component of a network, or distributed between some combination of such devices.

The interface bus is configured to communicate, transmit, and transfer data, controls, and commands between the various components of the electronic device. The system memory and the storage device comprise computer readable storage media, such as RAM, ROM, EEPROM, hard-drives, CD-ROMs, optical storage devices, magnetic storage devices, flash memory, and other tangible storage media. Any of such computer readable storage medium can be configured to store instructions or program codes embodying aspects of the disclosure. Additionally, the system memory comprises an operation system and applications. The processor is configured to execute the stored instructions and can comprise, for example, a logical processing unit, a microprocessor, a digital signal processor, and the like.

The system memory and the storage device may also comprise computer readable signal media. A computer readable signal medium may include a propagated data signal with computer readable program code embodied therein. Such a propagated signal may take any of variety of forms including, but not limited to, electro-magnetic, optical, or any combination thereof. A computer readable signal medium may be any computer readable medium that is not a computer readable storage medium and that can communicate, propagate, or transport a program for use in connection with the computing system.

Further, the input and output peripherals include user interfaces such as a keyboard, screen, microphone, speaker, other input/output devices, and computing components such as digital-to-analog and analog-to-digital converters, graphical processing units, serial ports, parallel ports, and universal serial bus. The input/output peripherals may also include a variety of sensors, such as light, proximity, GPS, magnetic field, altitude, velocity/acceleration. RSSI, and distance sensors, as well as other types of sensors. The input/output peripherals may be connected to the processor through any of the ports coupled to the interface bus.

The user interfaces can be configured to allow a user of the computing system to interact with the computing system. For example, the computing system may include instructions that, when executed, cause the computing system to generate a user interface and carry out other methods and operations that the user can use to provide input to the computing system and to receive an output from the computing system.

This user interface may be in the form of a graphical user interface that is rendered at the screen and that is coupled with audio transmitted on the speaker and microphone and input received at the keyboard. In an embodiment, the user interface can be locally generated at the computing system. In another embodiment, the user interface may be hosted on a remote computing system and rendered at the computing system. For example, the server may generate the user interface and may transmit information related thereto to the computing device that, in turn, renders the user interface to the user. The computing device may, for example, execute a browser or an application that exposes an application program interface (API) at the server to access the user interface hosted on the server.

Finally, the communication peripherals of the computing system are configured to facilitate communication between the computing system and other computing systems (e.g., between the computing device and the server) over a communications network. The communication peripherals include, for example, a network interface controller, modem, various modulators/demodulators and encoders/decoders, wireless and wired interface cards, antenna, and the like.

The communication network includes a network of any type that is suitable for providing communications between the computing device and the server and may comprise a combination of discrete networks which may use different technologies. For example, the communications network includes a cellular network, a WiFi/broadband network, a local area network (LAN), a wide area network (WAN), a telephony network, a fiber-optic network, or combinations thereof. In an example embodiment, the communication network includes the Internet and any networks adapted to communicate with the Internet. The communications network may be also configured as a means for transmitting data between the computing device and the server.

The techniques described above may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

As previously noted, the various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The terms and descriptions used above are set forth by way of illustration only and are not meant as limitations. Those skilled in the art will recognize that those and many other variations, enhancements and modifications of the concepts described herein are possible without departing from the underlying principles of the invention. The scope of the invention should therefore be determined only by the following claims and their equivalents.

What is claimed is:

1. A computer implemented method for determining a heading estimate of a portable device worn or carried by a user, comprising:
   collecting data from a plurality of sensors associated with the portable device;
   determining with a processor a confidence level associated with data collected from each of the plurality of sensors;
   determining with the processor if the portable device is indoors or outdoors based on the collected sensor data and the confidence level, wherein collected sensor data with a low confidence level is not used to determine if the portable device is indoors or outdoors; and
   determining the heading estimate using a particle filter based on the indoor or outdoor determination and the collected sensor data.

2. The computer implemented method of claim 1, wherein the plurality of sensors include a light sensor, wherein the data collected from the light sensor includes one or more of light intensity, light type, and light variance, and wherein determining if the portable device is indoors or outdoors includes determining if the portable device has transitioned between indoors and outdoors based on the data collected from the light sensor.

3. The computer implemented method of claim 2, further comprising collecting data from one or more sources unassociated with the portable device, wherein the data collected includes sunset and sunrise information for a location of the portable device, and further comprising enabling the light sensor at a threshold time after sunrise and disabling the light sensor at a threshold time before or after sunset.

4. The computer implemented method of claim 2, wherein the plurality of sensors include a proximity sensor, and further comprising disabling the light sensor when data collected from the proximity sensor indicates that the light sensor is obstructed from light and enabling the light sensor when data collected from the proximity sensor indicates that the light sensor is no longer obstructed from light.

5. The computer implemented method of claim 1, wherein determining the heading estimate includes assigning a lower weight to particles located outside of a building when the portable device is determined to be indoors, and assigning a lower weight to particles located inside of a building when the portable device is determined to be outdoors.

6. The computer implemented method of claim 1, wherein the plurality of sensors include a motion tracker providing the location and a magnetometer providing magnetic field readings, and wherein determining if the portable device is indoors or outdoors includes determining magnetic field variance based on the location.

7. The computer implemented method of claim 6, wherein determining the heading estimate includes assigning a lower weight to particles located outside of a building when the portable device is determined to be indoors, and assigning a lower weight to particles located inside of a building when the portable device is determined to be outdoors.

8. The computer implemented method of claim 1, wherein the plurality of sensors includes a GPS system providing signal-to-noise ratio data from one or more high elevation satellites and signal-to-noise ratio data from one or more low elevation satellites, and wherein determining if the portable device is indoors or outdoors includes determining a degradation in the signal-to-noise ratio data from the one or more high elevation satellites.

9. The computer implemented method of claim 8, wherein determining the heading estimate includes assigning a lower weight to particles located outside of a building when the portable device is determined to be indoors, and assigning a lower weight to particles located inside of a building when the portable device is determined to be outdoors.

10. The computer implemented method of claim 1, wherein the plurality of sensors includes a GPS system providing signal-to-noise ratio data from one or more satellites, and wherein determining if the portable device is indoors or outdoors includes determining a variance in an average of the signal-to-noise ratio data.

11. The computer implemented method of claim 10, wherein determining the heading estimate includes assigning a lower weight to particles located outside of a building when the portable device is determined to be indoors, and assigning a lower weight to particles located inside of a building when the portable device is determined to be outdoors.

12. The computer implemented method of claim 1, wherein the plurality of sensors includes a received signal strength indicator providing received signal strength indication (RSSI), and wherein determining if the portable device is indoors or outdoors includes determining a variance in the RSSI over a period of time.

13. The computer implemented method of claim 12, wherein determining the heading estimate includes assigning a lower weight to particles located outside of a building when the portable device is determined to be indoors, and assigning a lower weight to particles located inside of a building when the portable device is determined to be outdoors.

14. The computer implemented method of claim 1, further comprising collecting data from one or more sources unassociated with the portable device, wherein the data collected includes an outline of a building near the location of the portable device, further comprising determining a grid of most probable building grid directions based on the outline, and wherein determining if the portable device is indoors or outdoors includes determining that the portable device is moving along a grid direction of the grid over a period of time.

15. The computer implemented method of claim 14, wherein determining the heading estimate includes assigning a lower weight to particles located outside of a building when the portable device is determined to be indoors, and assigning a lower weight to particles located inside of a building when the portable device is determined to be outdoors.

16. The computer implemented method of claim 1, further comprising:
   automatically correcting a heading for the portable device based on the determination of whether the portable device is indoors or outdoors.

17. The computer implemented method of claim 14, wherein determining the grid includes increasing particle weighting for particles with heading directed along the grid.

\* \* \* \* \*